US012025281B1

(12) United States Patent
Lin

(10) Patent No.: US 12,025,281 B1
(45) Date of Patent: Jul. 2, 2024

(54) SEE-THROUGH FLAME IMITATION DEVICE

(71) Applicant: Uni-Splendor Corporation, Tainan (TW)

(72) Inventor: Yu-Yuan Lin, Tainan (TW)

(73) Assignee: Uni-Splendor Corporation, Tainan (TW)

( * ) Notice: Subject to any disclaimer, the term of this patent is extended or adjusted under 35 U.S.C. 154(b) by 0 days.

(21) Appl. No.: 18/403,563

(22) Filed: Jan. 3, 2024

(51) Int. Cl.
*F21S 10/04* (2006.01)
*F21V 9/40* (2018.01)
*F21V 11/16* (2006.01)
*F21V 14/04* (2006.01)
*F24C 7/00* (2006.01)

(52) U.S. Cl.
CPC .............. *F21S 10/046* (2013.01); *F21V 9/40* (2018.02); *F21V 11/16* (2013.01); *F21V 14/04* (2013.01); *F21S 10/04* (2013.01); *F21S 10/043* (2013.01); *F21V 14/045* (2013.01); *F24C 7/004* (2013.01)

(58) Field of Classification Search
CPC ........ F21S 10/04; F21S 10/043; F21S 10/046; F21V 14/04; F21V 14/045; F24C 7/004
See application file for complete search history.

(56) References Cited

U.S. PATENT DOCUMENTS

| | | | | |
|---|---|---|---|---|
| 6,564,485 B1 * | 5/2003 | Hess | F24C 7/004 | 40/428 |
| 2010/0229849 A1 * | 9/2010 | Asofsky | F24C 7/004 | 126/500 |
| 2012/0155075 A1 * | 6/2012 | Asofsky | F24C 7/004 | 362/231 |
| 2017/0167678 A1 * | 6/2017 | Gallo | F21S 10/046 | |
| 2020/0200392 A1 * | 6/2020 | Lu | F21S 10/046 | |
| 2023/0051360 A1 * | 2/2023 | Vo | F24C 7/004 | |

FOREIGN PATENT DOCUMENTS

| | | | |
|---|---|---|---|
| EP | 1020685 A2 * | 7/2000 | F24C 7/004 |

* cited by examiner

*Primary Examiner* — Colin J Cattanach
(74) *Attorney, Agent, or Firm* — Best & Flanagan LLP

(57) ABSTRACT

A see-through flame imitation device comprises a casing, a control device, a light emitting device, a flickering device, a flame imitation board, and at least one projection board. The casing includes a receiving chamber and two transparent panels respectively mounted on two sides of the receiving chamber. The light emitting device includes a lamp base disposed in the receiving chamber and light emitting members disposed on the lamp base and electrically connected to the control device. The flickering device is disposed in the receiving chamber to reflect light rays emitted from the light emitting members. The flame imitation board is disposed below the receiving chamber and includes through-holes permitting passage of the light rays reflected by the flickering device. The at least one projection board is disposed in the receiving chamber and includes a translucent projection section at a lower portion thereof and a see-through section above the projection section.

10 Claims, 10 Drawing Sheets

SEE-THROUGH FLAME IMITATION DEVICE

BACKGROUND OF THE INVENTION

The present invention relates to a see-through flame imitation device and, more particularly, to a see-through device enabling observation of simulated flames in two directions while providing a see-through effect.

To increase the indoor visual effect of warmth, a currently available electric type device may generates simulated flames in which lamps generate flame-like light to provide a visual effect similar to burning flames. For an example, U.S. Pat. No. 9,739,433 discloses a flame simulating assembly including a casing having a front end for display and a closed rear end. A light source for producing light, a rotatable flicker element, a flame effect element, and a screen are disposed in the casing. The flame effect element includes at least one aperture, such that the light emitted from the light source can be reflected by the flickering element to pass through the at least one aperture and then projected onto the screen. Thus, images of flickering flames are generated on the screen.

However, the above flame simulating assembly only allows observation of the images of flickering flames from the front side. The images of flickering flames cannot be observed from the rear side, providing limited visual angles.

CN210801000 discloses an electric fireplace including two screens respectively on front and rear sides thereof, a flame imitation plate, and a light source. The light rays emitted from the light source pass through the holes of the flame imitation plate and are projected onto the two screens, such that imitation flames can be seen from both the front and rear sides of the electric fireplace. Therefore, the electric fireplace is suitable for installation in a central portion of a wall, and the simulated flames can be seen from two opposite sides of the wall, thereby increasing the visual effect.

However, an observer at the front end of the electric fireplace cannot see through the electric fireplace, and, thus, cannot see the scene behind the electric fireplace.

To overcome the drawback of the above patent, CN101608803 discloses an electric fireplace including front and rear imaging mechanisms respectively disposed on front and rear sides of a casing to present simulated flames. A see-through window is disposed on a top end of the casing. Thus, when the electric fireplace is installed in a wall, simulated flames can be seen from both the front side and the rear side of the wall, and an observer can see the scene in front of or behind the wall through the see-through window.

However, the volume of the electric fireplace must be increased to match with the see-through window, and the wall must have a larger hole for installation of the electric fireplace having a larger volume, which is inconvenient to installation and expensive.

BRIEF SUMMARY OF THE INVENTION

An objective of the present invention is to provide a see-through flame imitation device enabling observation of simulated flames in two directions while providing a see-through effect.

A see-through flame imitation device according to the present invention comprises a casing, a control device, a light emitting device, a flickering device, a flame imitation board, and at least one projection board. The casing includes a receiving chamber at a central portion thereof and two opening sections respectively on front and rear sides of the casing. Two transparent panels are respectively mounted in the two opening sections. The light emitting device includes a lamp base and a plurality of light emitting members. The lamp base is disposed in the receiving chamber. The plurality of light emitting members is disposed on the lamp base and electrically connected to the control device. The flickering device is disposed in the receiving chamber and is configured to reflect light rays emitted from the plurality of light emitting members. The flame imitation board is disposed below the receiving chamber and includes a plurality of through-holes through which the light rays reflected by the flickering device are passable. The at least one projection board is disposed in a central area of the receiving chamber and includes a projection section at a lower portion thereof and a see-through section above the projection section. The projection section is substantially translucent. The see-through section is approximately transparent.

In an example, the projection section of the at least one projection board is gradient and has increasing transparency from bottom to top.

In an example, the at least one projection board has a main body made of a transparent material. A film having a color is formed on the lower portion of the at least one projection board by spraying, bonding, or coating.

In an example, a thickness of the film at a lower end of the projection section is greater than a thickness of the film at an upper end of the projection section, forming a gradient thickness.

In an example, the at least one projection board includes a lower board and an upper board stacked on top of the lower board in a height direction. The lower board is translucent and corresponds to the projection section. The upper board is substantially transparent and corresponds to the see-through section.

In an example, another lower board stacked on the lower board in a thickness direction perpendicular to the height direction. The lower board and the another lower board have different transparencies, such that the projection section has increasing transparency from bottom to top.

In an example, the at least one projection board includes at least one first board which is substantially transparent and at least one second board which is translucent and which is stacked on a lower portion of the at least one first board in a thickness direction, thereby forming the projection section and the see-through section above the projection section.

In an example, a reflective board is disposed in the receiving chamber of the casing. A portion of the light rays emitted by the plurality of light emitting members passes through a portion of the plurality of through-holes of the flame imitation board and is projected onto a side of the at least one projection board. Another portion of the light rays emitted by the plurality of light emitting members passes through another portion of the plurality of through-holes of the flame imitation board and is reflected by the reflective board to project onto another side of the at least one projection board.

In an example, a plurality of light concentrating shields is disposed on the lamp base and defines a space and an opening. The plurality of light emitting members is disposed in the space defined by the plurality of light concentrating shields and is configured to emit the light rays toward the opening.

In an example, the flickering device includes a motor, a shaft, and a plurality of reflective plates. The motor is electrically connected to the control device. The shaft is rotatably received in the receiving chamber and is configured to be driven by the motor to rotate. The plurality of reflective plates is disposed on the shaft and is configured to reflect the light rays emitted by the plurality of light emitting members.

The see-through flame imitation device according to the present invention can be mounted in a wall. An observer at the front side of the wall can see the scene behind the wall via the see-through section above the projection section, and an observer at the rear side of the wall can see the scene in front of the wall via the see-through section above the projection section, thereby providing convenience as a window.

In operation of the see-through flame imitation device according to the present invention, the control device is operated to activate the plurality of light emitting members of the light emitting device to emit light and to active the motor of the flickering device to operate. The light rays emitted by the plurality of light emitting members are concentrated by the plurality of light concentrating shields to be incident toward the plurality of reflective plates which reflects the light rays to pass through the plurality of through-holes of the flame imitation board and then project onto the projection section at the lower portion of the projection board, thereby generating simulated flames. Furthermore, since the transparency of the projection section is a gradient design (the transparency increases from bottom to top), the projection brightness at the lower end of the projection section is higher than that at the upper end of the projection area. This enables generation of a simulated flame pattern whose lower portion has bigger flames, thereby providing a lively visual effect. Furthermore, since the projection section is translucent, the simulated flames can be observed from the front side or the rear side of the projection section. The see-through flame imitation device according to the present invention enables observation of the simulated flames from both the front side and the rear side of the wall.

The present invention will become clearer in light of the following detailed description of illustrative embodiments of this invention described in connection with the drawings.

DETAILED DESCRIPTION OF THE INVENTION

Figure 1:
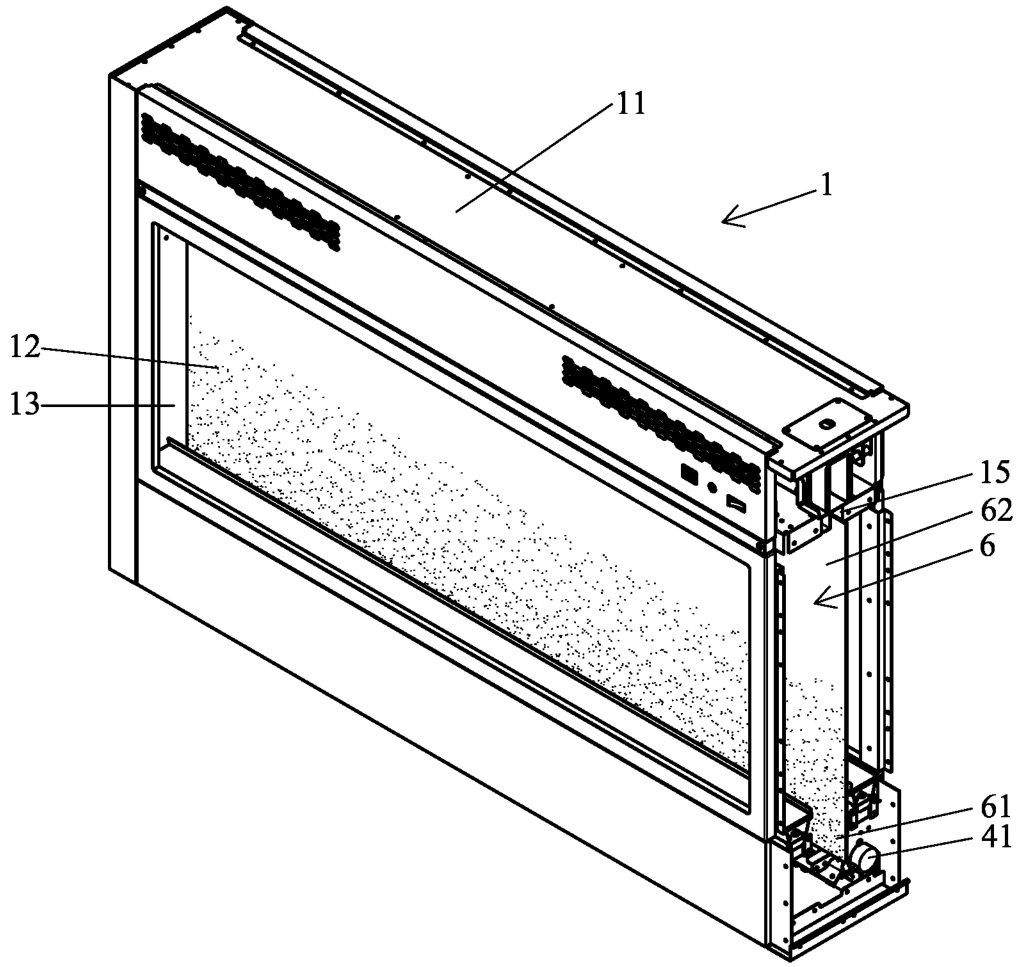
FIG. 1 is a partial, perspective view of a see-through flame imitation device of a first embodiment according to the present invention.
Figure 2:
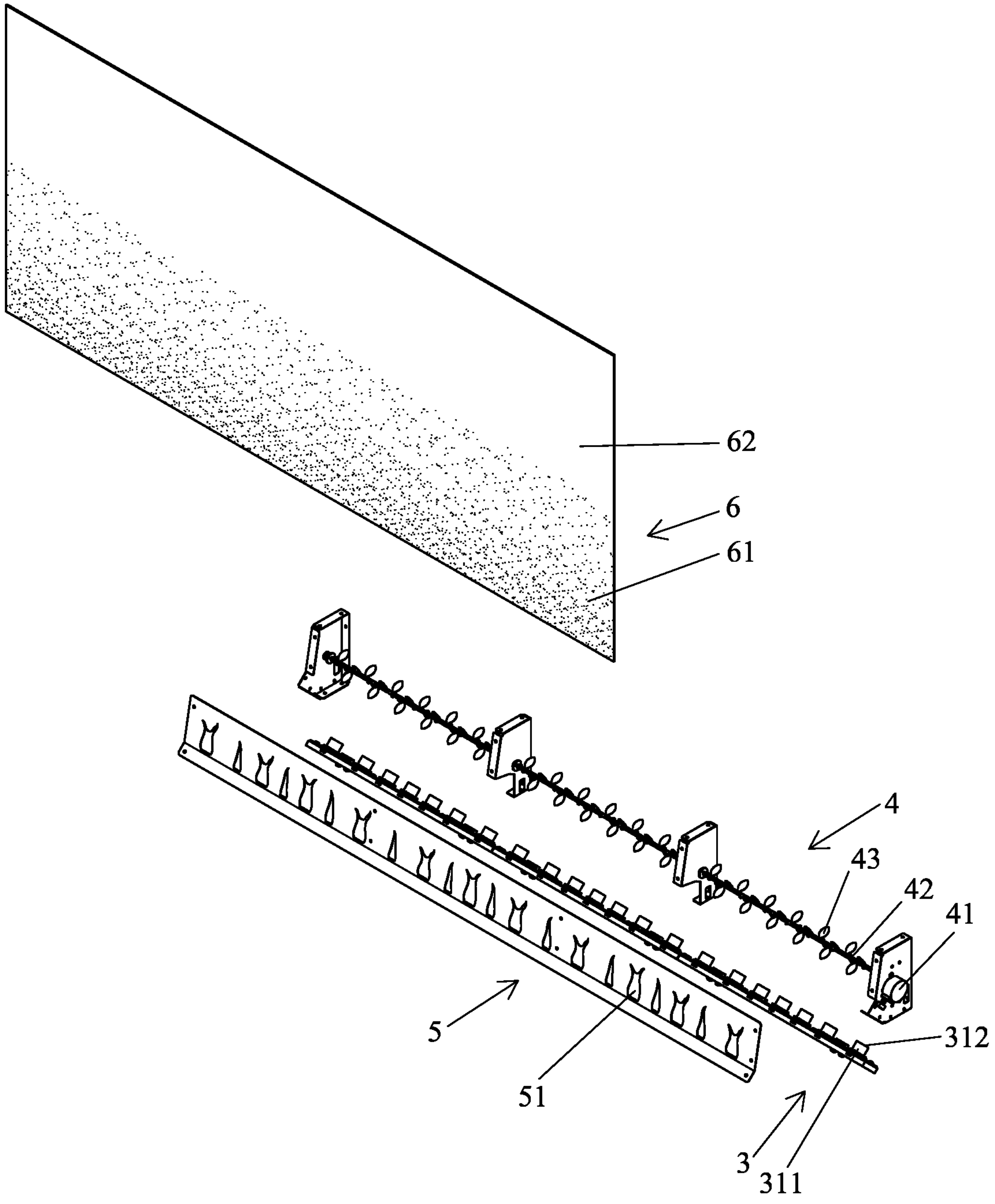
FIG. 2 is an exploded, perspective view of a portion of the see-through flame imitation device of the first embodiment according to the present invention.
Figure 3:
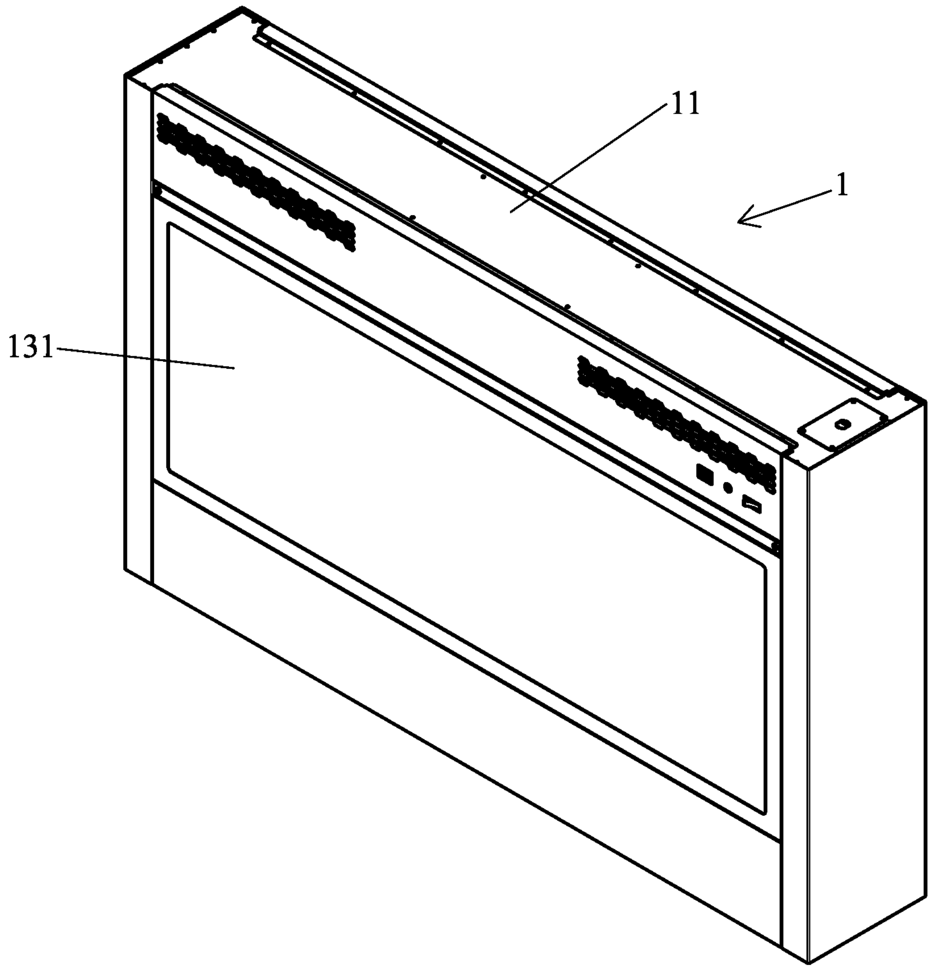
FIG. 3 is a perspective view of the see-through flame imitation device of the first embodiment according to the present invention.
Figure 4:
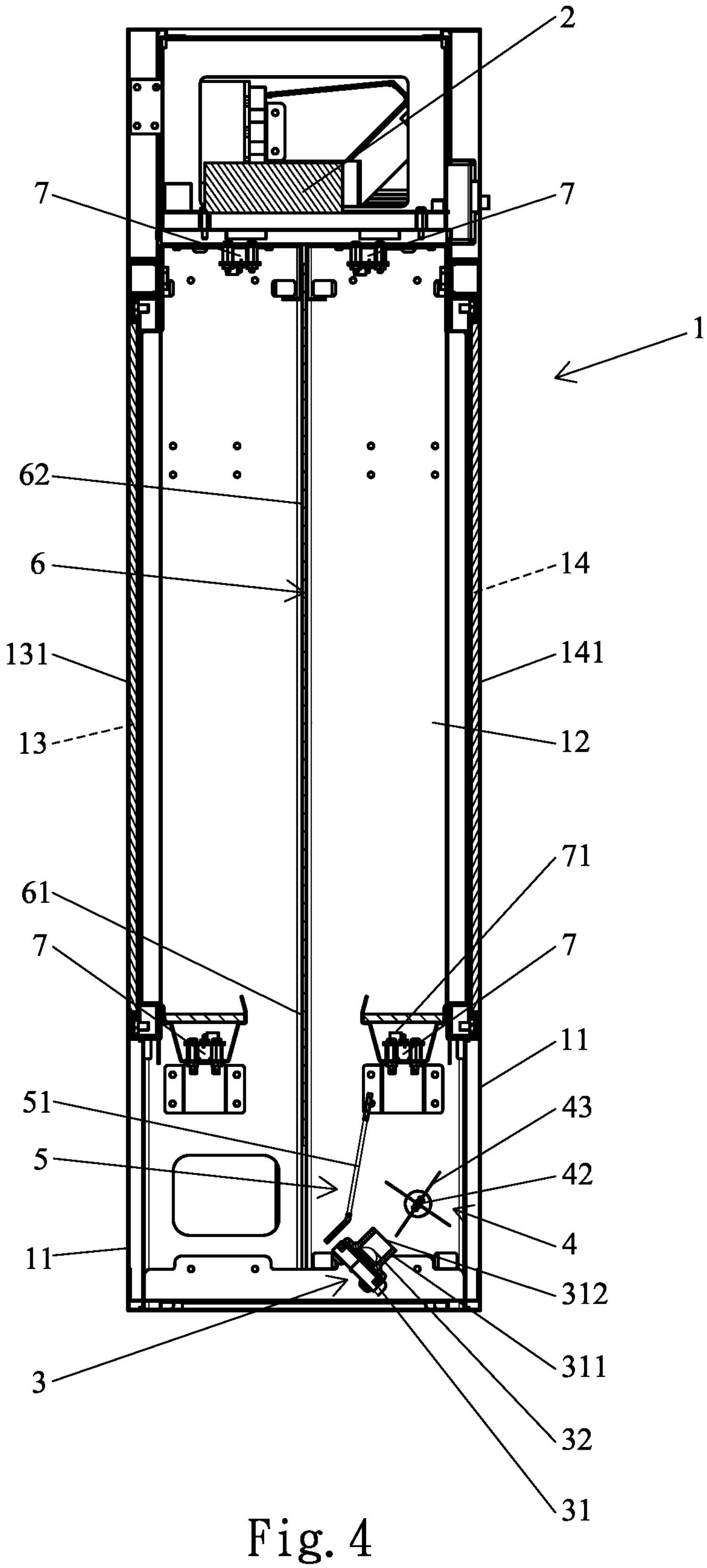
FIG. 4 is a cross sectional view of the see-through flame imitation device of the first embodiment according to the present invention after assembly.

Please refer to FIGS. 1-4 showing a perspective view of a portion of a see-through flame imitation device of a first embodiment according to the present invention, an exploded view of a portion of the see-through flame imitation device, a perspective view of the see-through flame imitation device after assembly, and a cross sectional view of the see-through flame imitation device after assembly. The see-through flame imitation device according to the present invention comprises a casing 1, a control device 2, a light emitting device 3, a flickering device 4, a flame imitation board 5, and a projection board 6. The casing 1 includes an annular frame 11 and a receiving chamber 12 at a central portion thereof. Two opening sections 13 and 14 are respectively provided on front and rear sides of the casing 1 and are spaced from each other in a thickness direction. Two vertically extending transparent panels 131 and 141 are respectively mounted in the two opening sections 13 and 14. An insertion groove 15 is provided in the central portion of the outer frame 1 and is configured to couple with a perimeter of the projection board 6. Furthermore, the control device 2 is disposed in the receiving chamber 12.

The light emitting device 3 includes a lamp base 31 and a plurality of light emitting members 32. The lamp base 31 is disposed in a lower portion of the receiving chamber 12. A plurality of light concentrating shields 311 is disposed on the lamp base 31 and defines a space and an opening 312. The plurality of light emitting members 32 may be light emitting diodes and is disposed in the space defined by the plurality of light concentrating shields 311. The plurality of light emitting members 32 is electrically connected to the control member 2 and is configured to emit the light rays toward the opening 312.

The flickering device 4 is disposed in the receiving chamber 12 and includes a motor 41, a shaft 42, and a plurality of reflective plates 43. The motor 41 is electrically connected to the control device 2. The shaft 42 is rotatably received in the receiving chamber 12 and is configured to be driven by the motor 41 to rotate. The plurality of reflective plates 43 is disposed on the shaft 42 and is configured to reflect the light rays emitted by the plurality of light emitting members 32.

The flame imitation board 5 is disposed below the receiving chamber 12 and includes a plurality of through-holes 51 each of which is in the shape of a flame. The light rays reflected by the flickering device 4 can pass through the plurality of through-holes 51.

The projection board 6 is a planar board and is disposed vertically in a central area of the receiving chamber 12. The perimeter of the projection board 16 is clamped in the insertion groove 15. The projection board 6 includes a projection section 61 at a lower portion thereof and a see-through section 62 above the projection section 61. The projection section 61 is substantially translucent and may be gradient, such that the transparency of the projection section 61 increases from bottom to top. The see-through section 62 may be approximately transparent.

The projection board 6 has a main body made of a transparent material, such as transparent glass, transparent plastic, or any other transparent board. Furthermore, a film having a color may be formed on the lower portion of the projection board 6 by spraying, bonding, or coating. Furthermore, the thickness of the film at a lower end of the projection section 61 may be greater than the thickness of the film at an upper end of the projection section 61, thereby forming a gradient thickness.

In this embodiment, a fill light base 7 is disposed in the receiving chamber 12. A fill light 71 is disposed on the fill light base 7 and is electrically connected to the control device 2. The fill light 71 can emit light toward a center of the receiving chamber 12.

Figure 5:
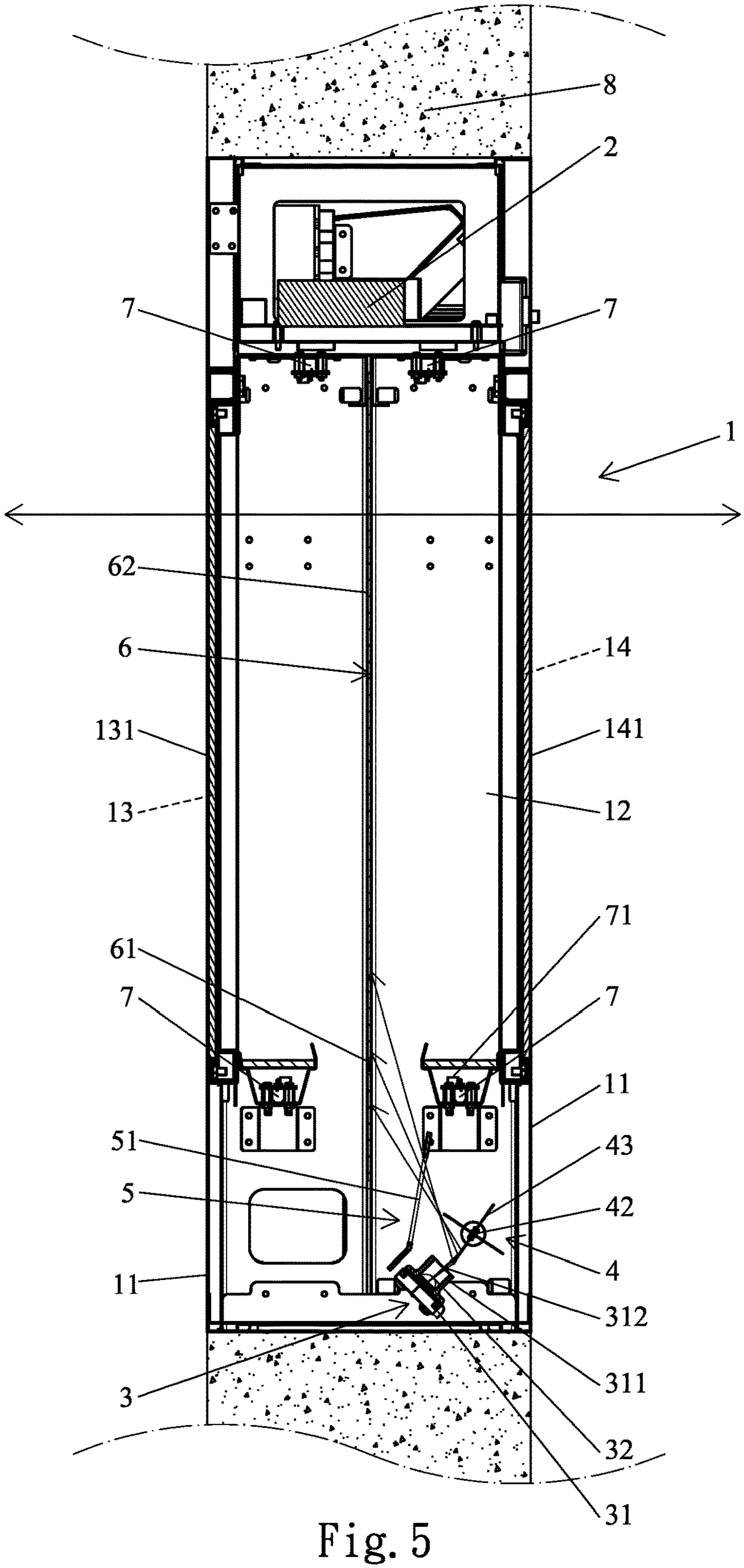
FIG. 5 is a schematic view of the see-through flame imitation device according to the present invention mounted in a wall, illustrating generation of simulated flames.
Figure 6:
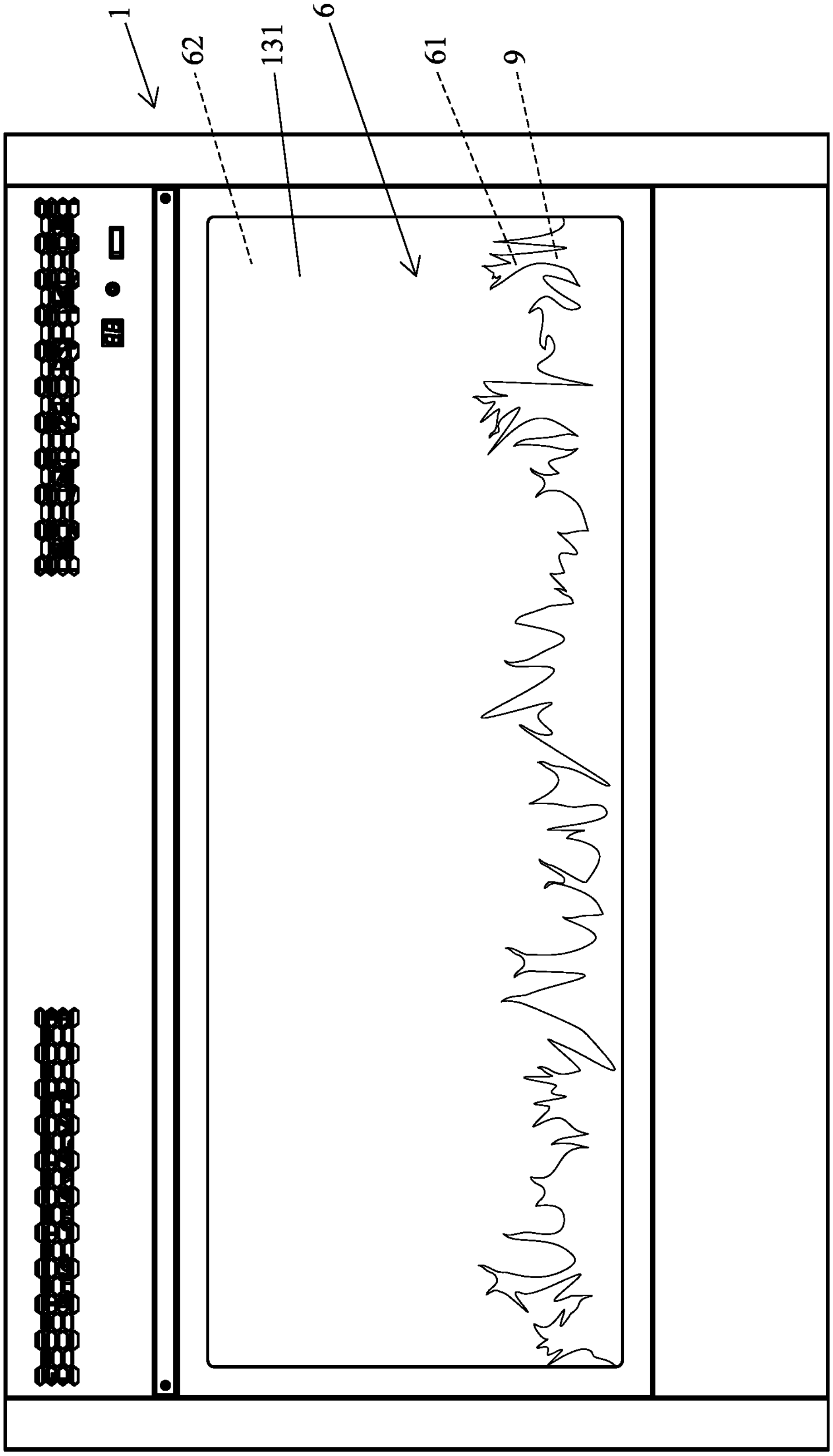
FIG. 6 is a schematic front view of the see-through flame imitation device of the first embodiment according to the present invention, illustrating generation of simulated flames.

FIGS. 5 and 6 illustrate generation of simulated flames by the see-through flame imitation device according to the present invention. The see-through flame imitation device according to the present invention can be mounted in a wall 8. As indicated by the arrow in the upper portion of FIG. 5, an observer at the front side of the wall 8 can see the scene behind the wall 8 via the see-through section 62 above the projection section 61, and an observer at the rear side of the wall 8 can see the scene in front of the wall 8 via the see-through section 62 above the projection section 61, thereby providing convenience as a window.

In operation of the see-through flame imitation device according to the present invention, the control device 2 is operated to activate the plurality of light emitting members 32 of the light emitting device 3 to emit light and to active the motor 41 of the flickering device 4 to operate. The light rays emitted by the plurality of light emitting members 32 are concentrated by the plurality of light concentrating shields 311 to be incident toward the plurality of reflective plates 43 which reflects the light rays to pass through the plurality of through-holes 51 of the flame imitation board 5 and then project onto the projection section 61 at the lower portion of the projection board 6, thereby generating simulated flames 9. Furthermore, since the transparency of the projection section 61 is a gradient design (the transparency increases from bottom to top), the projection brightness at the lower end of the projection section 61 is higher than that at the upper end of the projection area 61. This enables generation of a simulated flame pattern whose lower portion has bigger flames, thereby providing a lively visual effect. Furthermore, since the projection section 61 is translucent, the simulated flames 9 can be observed from the front side or the rear side of the projection section 61. Furthermore, by providing a light emitting device 3 and a flickering device 4, the see-through flame imitation device according to the present invention enables observation of the simulated flames 9 from both the front side and the rear side of the wall 8, which reduces the costs of components. Furthermore, the scene at the other side of the wall 8 can be seen via the see-through section 62, the aesthetics of the outline can be enhanced.

Furthermore, according to the present invention, the control device 2 can be used to activate the fill light 71, which provides improved brightness in the receiving chamber 12 and which enhances the atmosphere provided by the flame simulation device.

Figure 7:
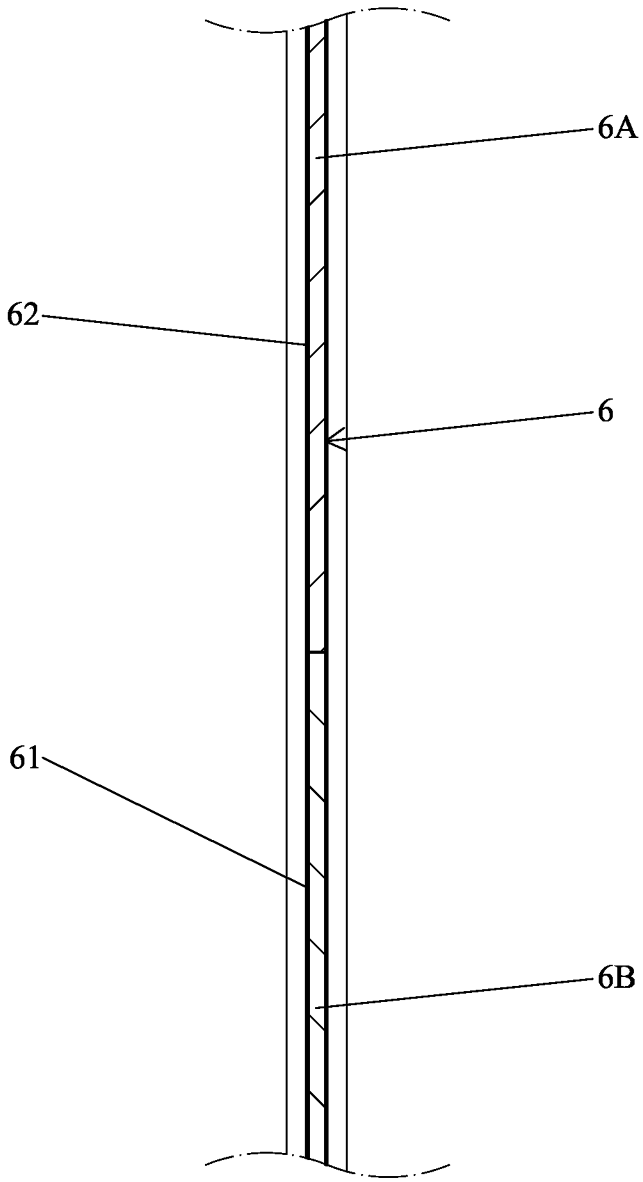
FIG. 7 is a schematic cross sectional view of a projection board of a see-through flame imitation device of a second embodiment according to the present invention.
Figure 7A:
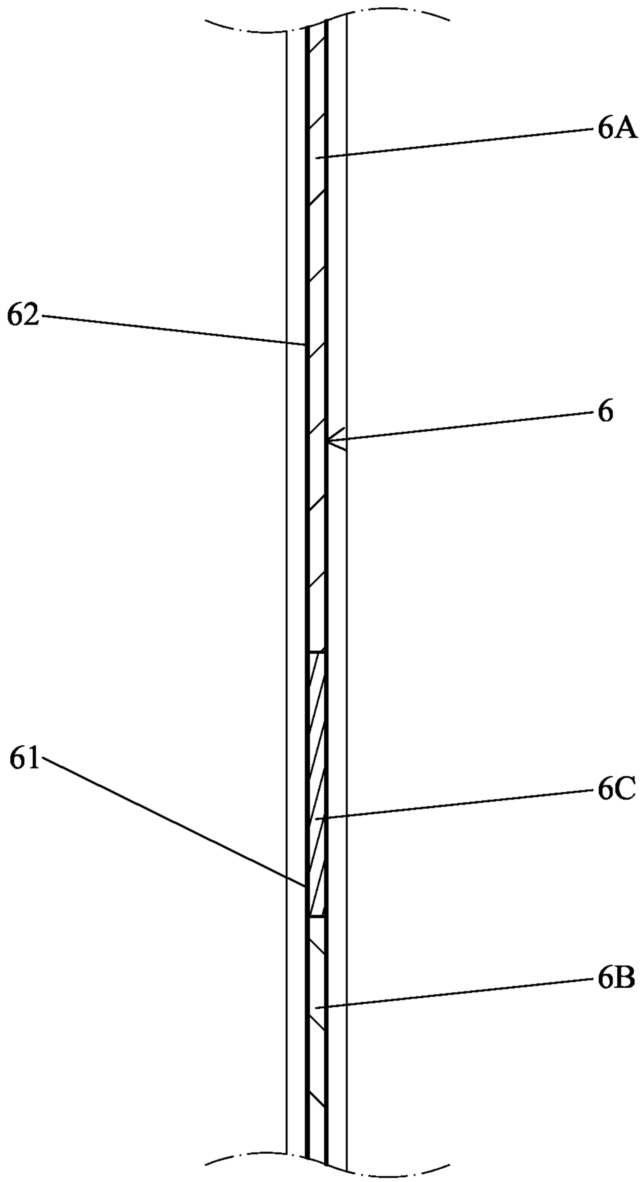
FIG. 7A is a schematic view of another example of the projection board of the see-through flame imitation device according to the present invention.

With reference to FIG. 7 showing a see-through flame imitation device of a second embodiment according to the present invention, the second embodiment is similar to the first embodiment, and the differences are that the projection board 6 includes a lower board 6B and an upper board 6A stacked on top of the lower board 6B in a height direction perpendicular to the thickness direction. The lower board 6B is translucent and corresponds to the projection section 61. The upper board 6A is substantially transparent and corresponds to the see-through section 62. Furthermore, the area of the lower board 6B is smaller than that of the projection board 6 comprised of a single board, permitting easier processing and manufacturing. Furthermore, as shown in FIG. 7A, another lower board 6C may be stacked on the lower board 6B in the thickness direction perpendicular to the height direction. The lower board 6B and the another lower board 6C have different transparencies, such that the projection section 61 has increasing transparency from bottom to top.

Figure 8:
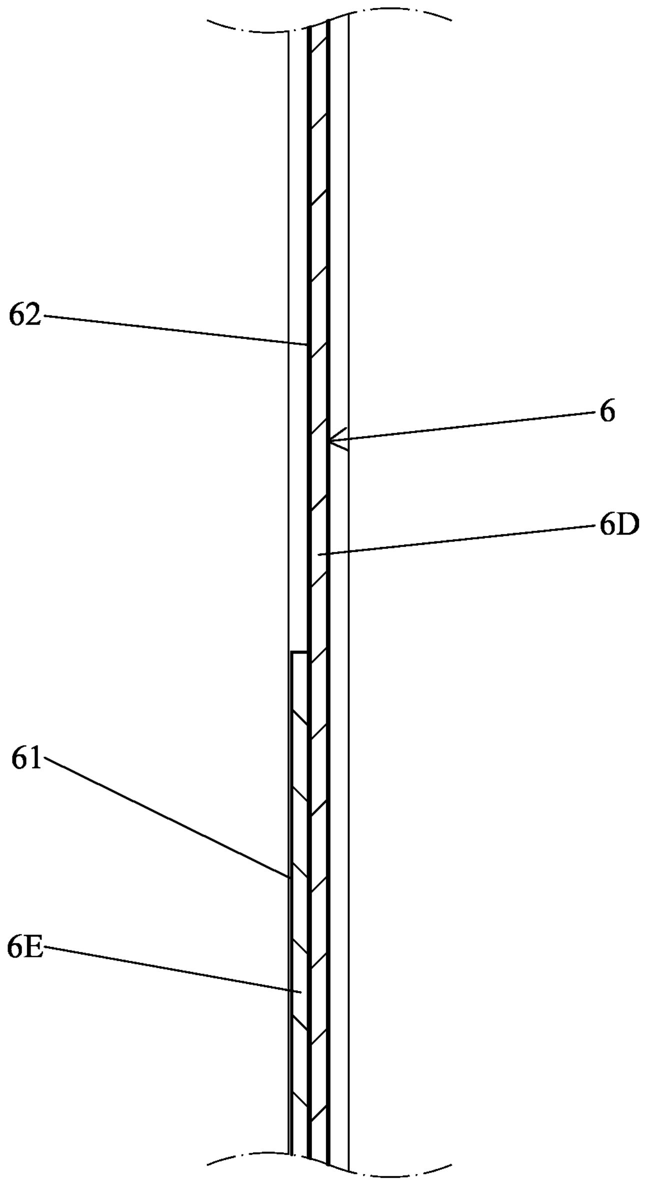
FIG. 8 is a schematic cross sectional view of a projection board of a see-through flame imitation device of a third embodiment according to the present invention.

With reference to FIG. 8 showing a see-through flame imitation device of a third embodiment according to the present invention, the third embodiment is similar to the first embodiment, and the differences are that the projection board 6 includes at least one first board 6D which is substantially transparent and at least one second board 6E which is translucent and which is stacked on a lower portion of the at least one first board 6D in the thickness direction, thereby forming the projection section 61 and the see-through section 62 above the projection section 61. Furthermore, the at least one translucent second board 6E with a smaller area is easier to process and manufacture.

Figure 9:
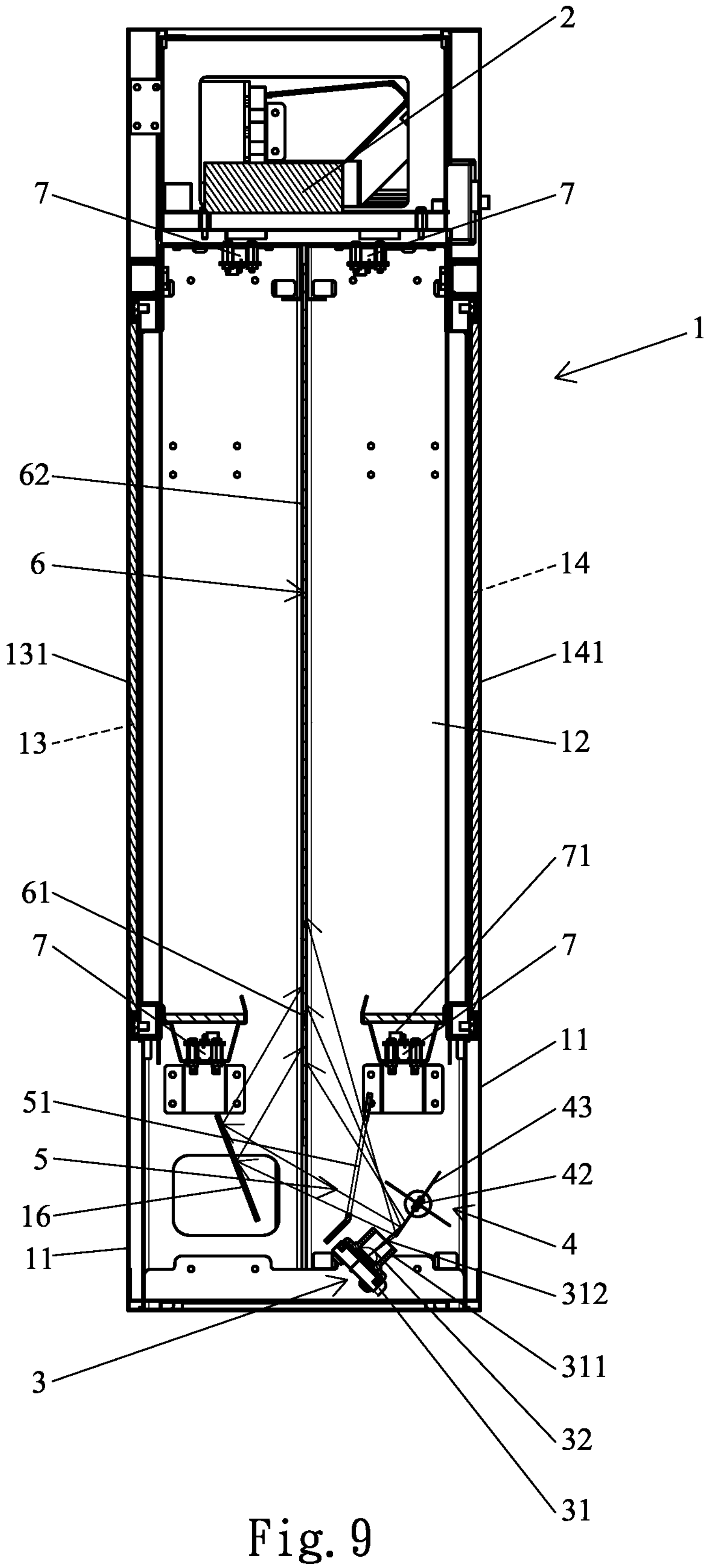
FIG. 9 is a schematic cross sectional view of a see-through flame imitation device of a fourth embodiment according to the present invention, illustrating generation of simulated flames.

With reference to FIG. 9 showing a see-through flame imitation device of a fourth embodiment according to the present invention, the fourth embodiment is similar to the first embodiment, and the differences are that a reflective board 16 disposed in the receiving chamber 12 of the casing 1. A portion of the light rays emitted by the plurality of light emitting members 32 passes through a portion of the through-holes 51 of the flame imitation board 5 and is projected onto a side of the projection board 6. Another portion of the light rays emitted by the plurality of light emitting members 32 passes through another portion of the through-holes 51 of the flame imitation board 5 and is reflected by the reflective board 16 to project onto another side of the projection board 6. Thus, better simulated flames are provided.

The see-through flame imitation device according to the present invention may include a light emitting device 3, a flickering device 4, and a flame imitation board 5 on each of the front side and the rear side of the receiving chamber 12 of the casing 1, and light rays can be emitted toward the front side and/or the rear side of the projection board 6. Furthermore, the simulated flames on the front side can be different from the simulated flames on the rear side under control.

The see-through flame imitation device according to the present invention is applicable on an electric fireplace or other produces providing simulated flames and can provide the effect of bi-directional, gradient, lively simulated flames and a see-through effect enabling an observer to see the scene on the other side of the wall 8.

Although specific embodiments have been illustrated and described, numerous modifications and variations are still possible without departing from the scope of the invention. The scope of the invention is limited by the accompanying claims.

The invention claimed is:

1. A see-through flame imitation device comprising:

a casing including a receiving chamber at a central portion thereof and two opening sections respectively on front and rear sides of the casing, and wherein two transparent panels are respectively mounted in the two opening sections;

a control device;

a light emitting device including a lamp base and a plurality of light emitting members, wherein the lamp base is disposed in the receiving chamber, wherein the plurality of light emitting members is disposed on the lamp base and electrically connected to the control device;

a flickering device disposed in the receiving chamber and configured to reflect light rays emitted from the plurality of light emitting members;

a flame imitation board disposed in a bottom portion of the receiving chamber and including a plurality of through-holes through which the light rays reflected by the flickering device are passable; and at least one projection board disposed in a central area of the receiving chamber and including a projection section at a lower portion thereof and a see-through section above the projection section, wherein the projection section is substantially translucent, and wherein the see-through section is approximately transparent.

2. The see-through flame imitation device as claimed in claim 1, wherein the projection section of the at least one projection board is gradient and has increasing transparency from bottom to top.

3. The see-through flame imitation device as claimed in claim 1, wherein the at least one projection board has a main body made of a transparent material, and wherein a film having a color is formed on the lower portion of the at least one projection board by spraying, bonding, or coating.

4. The see-through flame imitation device as claimed in claim 3, wherein a thickness of the film at a lower end of the projection section is greater than a thickness of the film at an upper end of the projection section, forming a gradient thickness.

5. The see-through flame imitation device as claimed in claim 1, wherein the at least one projection board includes a lower board and an upper board stacked on top of the lower board in a height direction, wherein the lower board is translucent and corresponds to the projection section, and wherein the upper board is substantially transparent and corresponds to the see-through section.

6. The see-through flame imitation device as claimed in claim 5, further comprising another lower board stacked on the lower board in a thickness direction perpendicular to the height direction, wherein the lower board and the another lower board have different transparencies, such that the projection section has increasing transparency from bottom to top.

7. The see-through flame imitation device as claimed in claim 1, wherein the at least one projection board includes at least one first board which is substantially transparent and at least one second board which is translucent and which is stacked on a lower portion of the at least one first board in a thickness direction, thereby forming the projection section and the see-through section above the projection section.

8. The see-through flame imitation device as claimed in claim 1, further comprising a reflective board disposed in the receiving chamber of the casing, wherein a portion of the light rays emitted by the plurality of light emitting members passes through a portion of the plurality of through-holes of the flame imitation board and is projected onto a side of the at least one projection board, and wherein another portion of the light rays emitted by the plurality of light emitting members passes through another portion of the plurality of through-holes of the flame imitation board and is reflected by the reflective board to project onto another side of the at least one projection board.

9. The see-through flame imitation device as claimed in claim 1, wherein a plurality of light concentrating shields is disposed on the lamp base and defines a space and an opening, and wherein the plurality of light emitting members is disposed in the space defined by the plurality of light concentrating shields and is configured to emit the light rays toward the opening.

10. The see-through flame imitation device as claimed in claim 1, wherein the flickering device includes a motor, a shaft, and a plurality of reflective plates, wherein the motor is electrically connected to the control device, wherein the shaft is rotatably received in the receiving chamber and is configured to be driven by the motor to rotate, and wherein the plurality of reflective plates is disposed on the shaft and is configured to reflect the light rays emitted by the plurality of light emitting members.

* * * * *